(12) United States Patent
Avant (10) Patent No.: US 8,165,970 B2
(45) Date of Patent: Apr. 24, 2012

(54) SYSTEMS AND METHODS FOR IMPLEMENTING AN ADDRESS DIRECTORY LINK

(75) Inventor: Oscar L. Avant, Silver Spring, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 10/901,331

(22) Filed: Jul. 29, 2004

(65) Prior Publication Data

US 2005/0187654 A1  Aug. 25, 2005

(51) Int. Cl.
*B65B 35/00* (2006.01)
(52) U.S. Cl. .......................... 705/406; 705/401
(58) Field of Classification Search .................. None
See application file for complete search history.

(56) References Cited

U.S. PATENT DOCUMENTS

| | | | | |
|---|---|---|---|---|
| 5,943,658 | A * | 8/1999 | Gravell et al. | 705/410 |
| 6,055,520 | A * | 4/2000 | Heiden et al. | 705/410 |
| 6,529,908 | B1 * | 3/2003 | Piett et al. | 1/1 |
| 6,549,892 | B1 * | 4/2003 | Sansone | 705/401 |
| 6,783,063 | B2 * | 8/2004 | Holden | 235/379 |
| 6,859,722 | B2 * | 2/2005 | Jones | 701/200 |
| 2002/0029202 | A1 * | 3/2002 | Lopez | 705/406 |
| 2002/0178089 | A1 * | 11/2002 | Bezos et al. | 705/26 |
| 2004/0015455 | A1 * | 1/2004 | Maarek | 705/500 |
| 2004/0186768 | A1 * | 9/2004 | Wakim et al. | 705/14 |
| 2007/0061222 | A1 * | 3/2007 | Allocca et al. | 705/26 |
| 2009/0074163 | A1 * | 3/2009 | Shaffer et al. | 379/142.05 |

OTHER PUBLICATIONS

"UPS high on new wireless ASP service", John Cox, Network World, v17n35, Aug. 28, 2000.*
Notification of Transmittal of the International Search Report and the Written Opinion of the International Searching Authority, or the Declaration; from the International Searching Authority; mailed Apr. 11, 2006. (10 pages).

* cited by examiner

*Primary Examiner* — Rutao Wu
(74) *Attorney, Agent, or Firm* — Finnegan, Henderson, Farabow, Garrett & Dunner, LLP (57) ABSTRACT

Methods and systems consistent with the present invention facilitate mailpiece processing by processing a mailpiece using an Address Directory Link (ADL) format. The present invention allows for mail to be sent when the sender may not know the delivery address of the desired recipient. In one embodiment, a method includes recognizing the ADL format on a mailpiece; reading ADL formatted data from the mailpiece; and determining a delivery address based on the ADL formatted data using an ADL database. Consistent with the present invention, this method may further include delivering the mailpiece to the delivery address associated with the ADL formatted data.

27 Claims, 6 Drawing Sheets

ADL Address Label

Pre-formatted Address block

Place PLANET code here (Optional)

PLEASE PRINT

NAME: ___________

TELEPHONE NUMBER

Place POSTNET code here (Optional)

310

400

450

Traditional Address Format

37c

Jack Hornblower
1467 Lockford
Hampton, VA
22082

John Doe
Any Street
My Town, MD

FIG. 4A

ADL Address Format

37c

Jack Hornblower
703 280 7129

John Doe
Any Street
My Town, MD

ADL address block

SYSTEMS AND METHODS FOR IMPLEMENTING AN ADDRESS DIRECTORY LINK

BACKGROUND OF THE INVENTION

1. Technical Field

This invention relates to systems and methods for delivering a mailpiece to a delivery address and, more particularly, to linking a telephone number to a delivery address, where the telephone number is used to indicate a delivery address.

2. Background Information

The United States Postal Service (USPS) is an independent government agency that provides mail delivery and other services to the public. The USPS is widely recognized as a safe and reliable means for sending and receiving mail. In today's conventional delivery systems, the sender of a mailpiece, for example, a parcel, places the recipient's name and address on the item to specify the delivery point, and gives it to a delivery service to deliver.

Conventional systems for identifying and processing mail utilize mechanical processing systems for sorting and directing a mailpiece. Mechanical processing systems attempt to identify the delivery address for each mailpiece and, if successful, to then process each mailpiece based on the delivery address.

The majority of conventional mechanical processing systems sort each mailpiece based on a special code, such as, a ZIP code or a bar code (i.e., a Postal Numeric Encoding Technique ("POSTNET") code). POSTNET is a barcode system used on letter-size and flat-size mailpieces for encoding the delivery point information and nine-digit ZIP code. After the USPS receives a mailpiece, POSTNET codes that identify the delivery point and nine-digit ZIP code are placed on the mailpiece in order to streamline the sorting process as the mailpiece moves through the USPS system. Conventional mechanical processing systems may contain an OCR machine, which can read and sort a mailpiece based on the ZIP code. These mechanical processing systems may also contain a Bar Code Sorter, which can read and sort a mailpiece based on the POSTNET code.

Mail and package delivery services throughout the world typically deliver items by using explicit destination point physical addresses, such as a business or residential street address or P.O. Box within a city and state. To manage large geographic areas, ZIP codes and other regional codes are used.

To manage geographic areas, telephone companies use Area Codes. For business purposes, the telephone companies associate and publish the physical address associated with the telephone connection. The USPS delivery point corresponds to the telephone companies' connection address. Thus, USPS and telephone companies maintain address directories that are essentially address redundant.

Currently, postal systems determine delivery point determination only from traditional addresses. The use of a telephone number for delivery point determination would thus be a new and useful capability for USPS. The use of an identification code, such as a telephone number, would allow a customer who does not know the postal addresses of a friend to still send the friend physical mail. This is beneficial to those customers who find it easier to obtain and remember telephone numbers and those who have few addresses but several telephone numbers stored, for example, in a personal digital assistant.

Systems and methods consistent with the present invention link a derivative of the telephone database with the postal database of physical addresses such that the delivery point may be determined in real-time at postal automation equipment by reading the telephone number from the mail-piece. This will enable postal systems to read and apply bar codes both for traditional addresses (i.e. addressee name, street address, city state, ZIP) and ADL addresses (i.e. addressee name and telephone number).

SUMMARY OF THE INVENTION

Methods and systems consistent with the present invention facilitate mailpiece processing by processing a mailpiece using an Address Directory Link (ADL) format.

One exemplary aspect of the present invention relates to a method for processing a mailpiece using an Address Directory Link (ADL) format, which includes recognizing the ADL format on a mailpiece; reading ADL formatted data from the mailpiece; and determining the delivery address based on the ADL formatted data using an ADL database.

Another exemplary aspect of the present invention relates to a system for processing a mailpiece using an Address Directory Link (ADL) format, which includes means for recognizing the ADL format on a mailpiece; means for reading ADL formatted data from the mailpiece; and means for determining a delivery address based on the ADL formatted data using an ADL database.

Another exemplary aspect of the present invention relates to a computer-readable medium containing instructions to configure a data processor to perform a method for processing a mailpiece using an Address Directory Link (ADL) format. The method includes recognizing the ADL format on a mailpiece; reading ADL formatted data from the mailpiece; and determining the delivery address based on the ADL formatted data using an ADL database.

Additional aspects of the invention are set forth in the detailed description which follows, and in part are obvious from the description, or may be learned by practice of methods and systems consistent with the present invention. The foregoing background and summary are not intended to be comprehensive, but instead serve to help artisans of ordinary skill understand the following implementations consistent with the invention set forth in the appended claims. In addition, the foregoing background and summary are not intended to provide any limitations on the claimed invention. Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Overview

Systems and methods consistent with the present invention provide for additional addressing format for mailpieces. One embodiment comprises an Address Directory Link ("ADL"). As used herein, an Address Directory Link (ADL) is electronic data that associates identifying information with a location where a mailpiece could be delivered. As used herein, "identifying information" could be a social security number, passport number, government identification number, credit card account number, telephone number or any set of numbers or letters that relate to an individual or group of associated individuals. When placed on a mailpiece, in a format that can be recognized, the identifying information is termed "ADL formatted data."

Examples set forth below describe use of ADL with a mailpiece, or letter mail, but the concept applies equally to parcels and "flats," that is, magazines and newspapers. As used herein, the term "mailpiece" refers to letter mail as well as parcels and flats. The basic concept is that automated mail sorting processes are modified to sort mail to the destination point using a telephone number in lieu of street line and city-state line. Other bar code components may also be present in the address block and are treated in the traditional way.

In the ADL addressing format, the address block consists primarily of the name and telephone number. The name is for the benefit of the recipient. The telephone number (the ADL formatted data) enables the sort distribution for the mailpiece. This implementation enables USPS sorters to recognize a simplified address format and provide additional intelligence to the mail stream. Both the ADL addressing format and traditional addressing formats can coexist in the mail-stream without negative transference.

The ADL format may be implemented using a "for fee" format that may be used in several scenarios, including: CONFIRM® customers wanting to automate synchronized mail/phone campaigns; "friend to friend" mailpieces where the customer only knows the phone number but has a prepared item to mail; and pre-formatted over-the-counter postage-embossed convenience envelopes sold to the public for postage+envelope+3 cents. As is known to one skilled in the art, CONFIRM® is a USPS service which provides advanced delivery information about incoming and outgoing mailpieces. Within the CONFIRM® service, each mailpiece is identified with an additional barcode, known as a PLANET® Code. A PLANET® Code is simply a barcode used within the CONFIRM® service that identifies a package and certain attributes associated with that package (e.g. name of sender, location of mailpiece, date/time of arrival at destination, etc.). As mailpieces with PLANET® Codes are processed, electronic records are created and sent to the customer via electronic mail. Customers can also access CONFIRM® records via the USPS web site. CONFIRM® therefore provides USPS customers with a method of tracking a mailpiece from origin to destination.

Reference will now be made in detail to specific exemplary embodiments consistent with the invention. Wherever possible, the same reference numbers will be used throughout the description to refer to the same or like parts. The invention is described using embodiments involving United States Postal Service (USPS) equipment and systems. One of ordinary skill in the art will recognize, however, that the principles of the present invention apply to a wide variety of delivery systems and methods and are not limited to the specific embodiments described.

Database Integration

Figure 1:
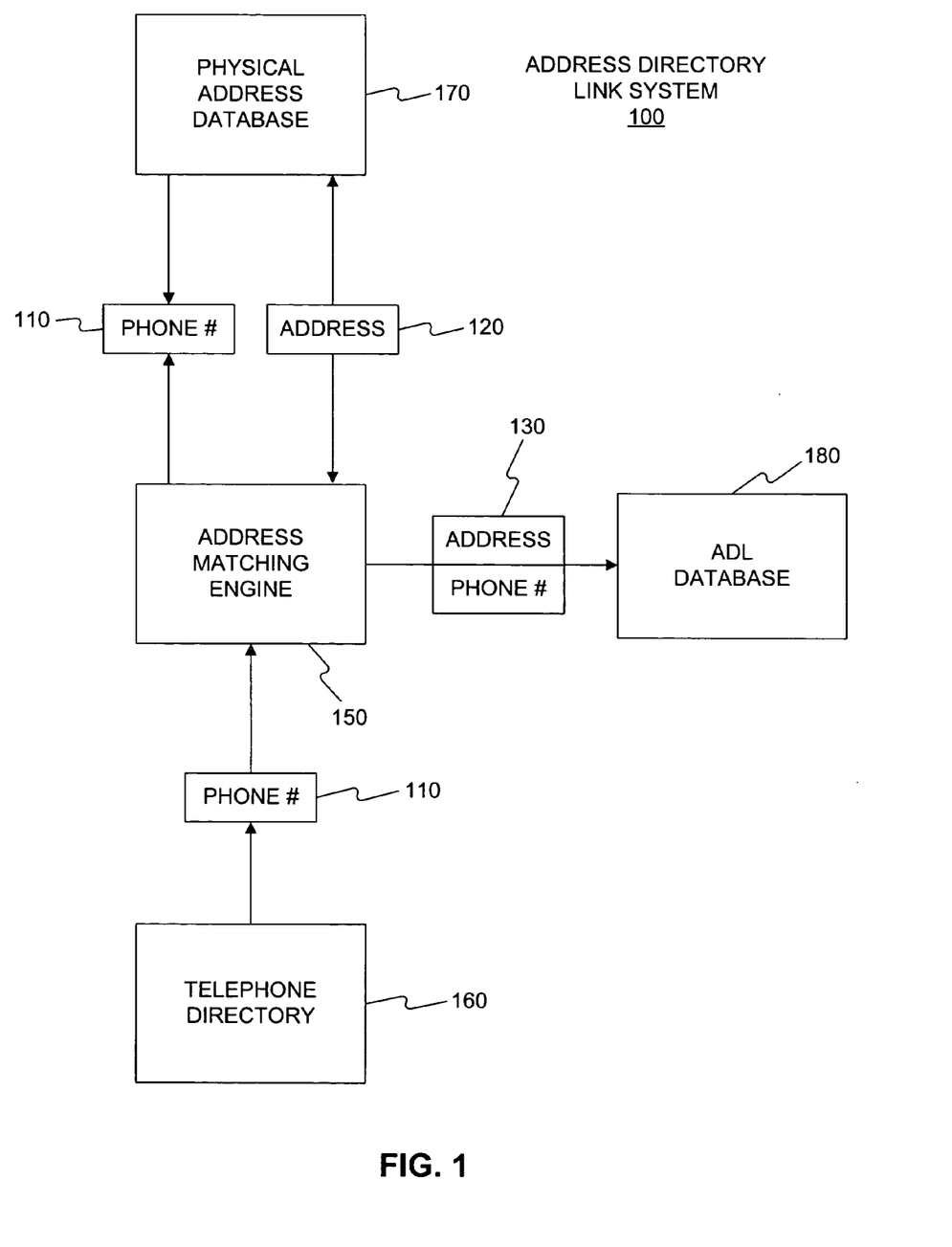
FIG. 1 is a functional block diagram of the address directory link system, consistent with an embodiment of the invention.

FIG. 1 is a high-level block diagram of Address Directory Link System ("ADL system") 100 for linking an identifying information, such as a telephone number, to a physical address of a customer. ADL system 100 may include an address matching engine 150, a telephone directory 160, a physical address database 170, and an ADL database 180. Address matching engine 150 may be a computer program or stand-alone device that interfaces with telephone directory 160 and address database 170 to create ADL database 180. ADL database 180 contains information that matches a location or address with identifying information for individuals at that location or address.

Telephone directory 160 may be provided by list vendors that maintain residential and business directories, as well known to those skilled in the art. In the United States there are approximately 100 million records in a typical residential directory and 2 million records in a typical business directory. The directories contain names, addresses, and telephone numbers, in addition to other information, and can be licensed annually with monthly updates. Many vendors have access to monthly updates via electronic feeds from all seven "Regional Bell" telephone companies, as well as a national disconnect file.

Address database 170 may comprise a Delivery Point File (DPF) directory, such as provided by the San Mateo USPS Center. The DPF directory stores every delivery point in the US and its territories, including approximately 200 million delivery point records. Address database 170 may incorporate ADL database 180, or ADL database 180 may be generated as a separate entity.

When a telephone number 110 is submitted, for example, by telephone directory 160, ADL system 100 submits it to an address matching engine 150 that communicates with physical address database 170. Address matching engine 150 submits the telephone number 110 as a query to address database 170, which returns a standardized physical address 120 to be linked to telephone number 110, then creating linked telephone number and address 130.

In one embodiment, standardized physical address 120 conforms to a pre-approved format and includes a nine-digit ZIP code. In this way, the physical address 120 linked to telephone number 110 is as complete and correct as possible. Address matching engine 150 may then send the linked telephone number and address 130 to Address Directory Link database (ADL database) 180. Telephone directory 160 may also be linked to address matching engine 150.

Telephone directory 160 has both addresses and telephone numbers. Telephone directory 160 may be used to merge telephone numbers into address directory 170 to create ADL database 180 for each delivery point that has a telephone. This integrating can be done at the National Directory Support System ("NDSS"). The NDSS is the offline automation support for mail processing activities. It maintains a database of standard labeling requirements and validates every package and letter address that is scanned by a USPS automated sorter. Those skilled in the art will be familiar with the NDSS and its function.

At the NDSS level, telephone directory 160 must be matched with address database 170 such that a telephone number can be associated with a single postal delivery point and this must be incorporated in ADL database 180. In many cases several telephone numbers may be directed to a single delivery point. For example there may be multiple telephones at a residence or business delivery point.

In the merging and processing of telephone and postal address files an address database record is associated with each telephone number. Since the NDSS is the central addressing source for all postal automation equipment, a solution at this level serves all products (i.e. letters, flats & parcels). As mail is processed on postal transports, a mailpiece presenting an ADL formatted address will be processed by the recognition system by using the telephone match to obtain the corresponding delivery point code.

As people move or new housing developments are built, the address database will be updated to service the new addresses. As telephone numbers change or are added, and the telephone company will update their database and service is continued. Thus, the systems and methods described herein preferably include a process of synchronizing databases to incorporate their most current status into an ADL database. This synchronization may take place on a periodic basis, for example, weekly.

In one embodiment, the mailpiece always goes to the delivery point designated by the database. In such an embodiment it is never re-directed. The originator has responsibility for placing the correct telephone number on the mailpiece. If the telephone number does not exist in the database, this fact could be captured at the first automated handling and the mailpiece returned to sender. There are no additional handling costs. Further, while it is recognized that 25% of people move every year, creating "churn" in the database, the advent of telephone number portability may reduce this churn in time. In one embodiment, when a telephone number is added or removed from the database, this will result in alternative handling, which may simply be a service notification to the sender.

Figure 2:
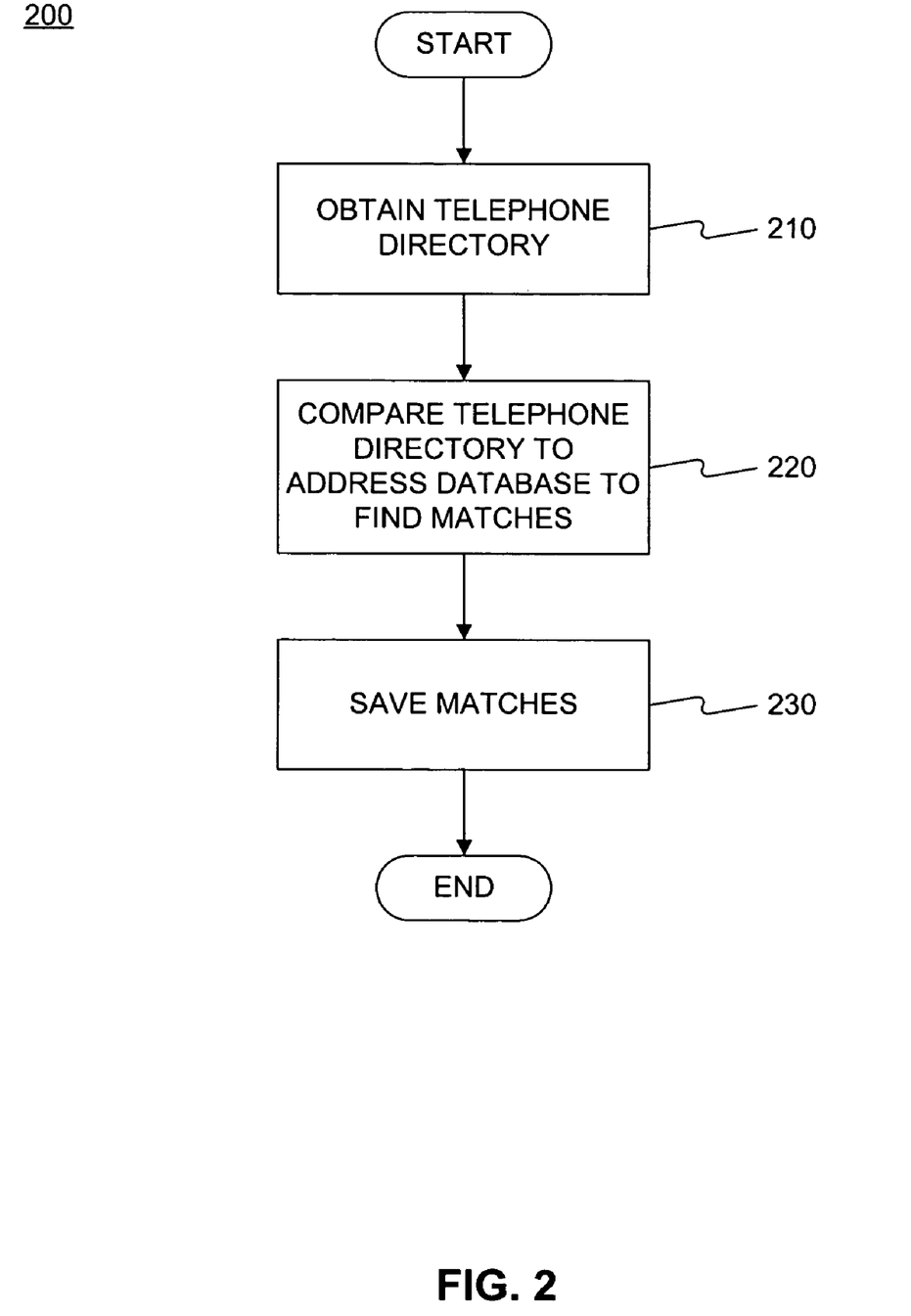
FIG. 2 is a flow diagram of linking addresses to phone numbers, consistent with an embodiment of the invention.

FIG. 2 is a flow diagram of steps to create an ADL Database. To create ADL Database 180, ADL system 100 adds a 10-digit telephone number from telephone directory 160 to the corresponding address in address database 170. Referring to FIG. 2, ADL system 100 obtains a telephone directory 160 containing addresses and telephone numbers (step 210). This directory will contain approximately 100 million records. Ideally, telephone directory 160 is updated as often as address database 170. ADL system 100 then runs the telephone records against address database 170 to find a match via the address associated with the telephone number in telephone directory 160 (step 220). Once the match is found, ADL system 100 saves the telephone number and corresponding delivery information to ADL Database 180 (step 230). Since the addresses maintained by the telephone companies or the commercial list providers are reasonably accurate, the match rate should approach 100%.

Address matching engine 150 will resolve most of the variations of the same address stored differently between USPS and telephone directory 160. Telephone directory 160 may contain only the telephone numbers and 11-digit delivery points. The size of this directory in uncompressed ASCII (American Standard Code for Information Interchange) format is about 1.65 GB assuming there are 150 million telephone numbers. Each telephone number thus maps to a unique delivery point. However, more than one telephone number may map to the same delivery point.

ADL database 180 may be used by the optical character reading (OCR) apparatus or recognition system 520 (see FIG. 5) to code mailpieces via telephone numbers. Various types of optical character reading apparatus are known to those skilled in the art, and thus need not be described in detail here. In this embodiment, the front-end recognition determines a telephone number instead of an address. The OCR apparatus uses the recognized telephone number to access ADL database 180 and determine an 11-digit ZIP code, or delivery address, location. In one embodiment, the data access method is direct access based on a telephone number, thus making the query instantaneous.

Mailpiece Layout

Figure 3:
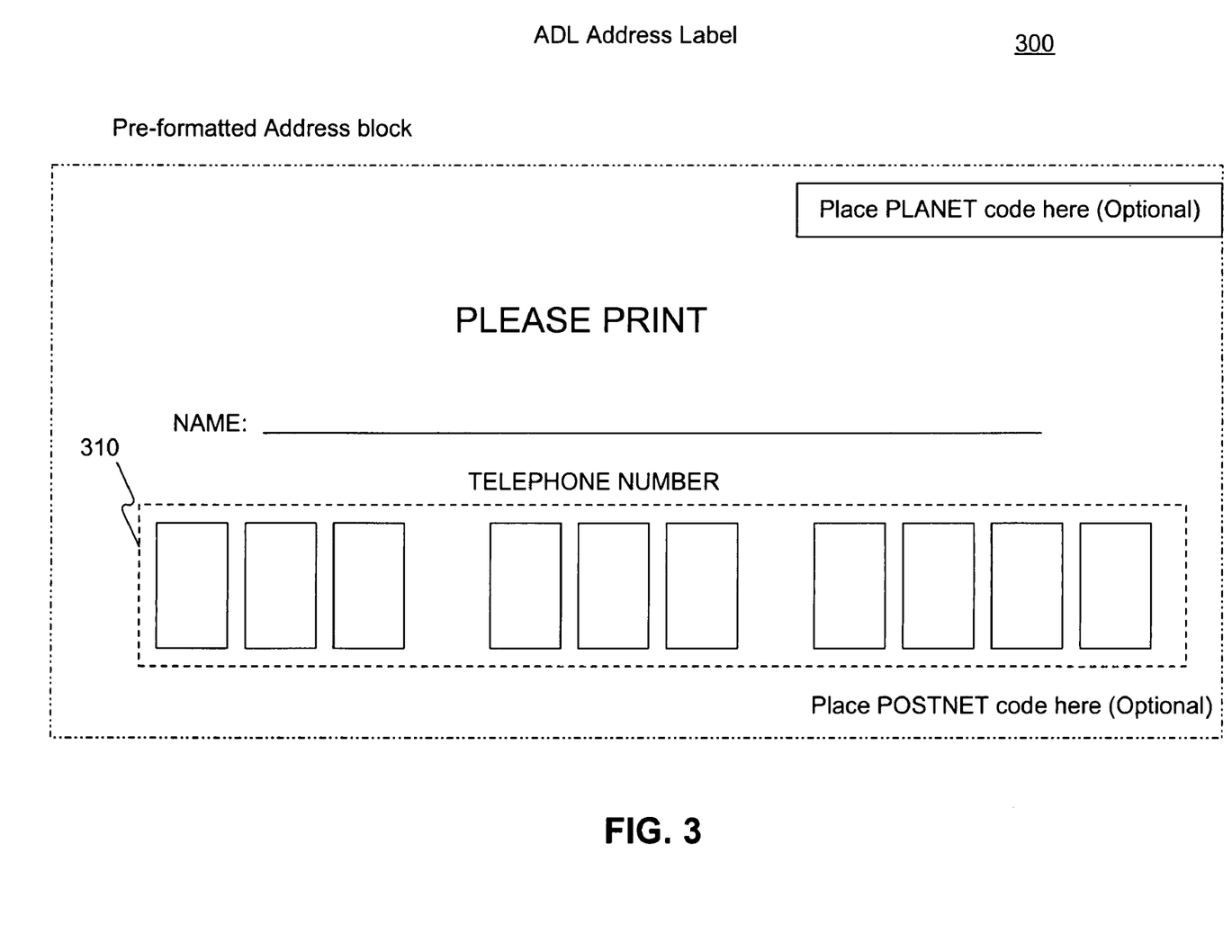
FIG. 3 is a graphical depiction of an exemplary mailpiece for using ADL, consistent with an embodiment of the invention.

FIG. 3 illustrates one embodiment of mailpiece 300, consistent with systems or methods for identifying and processing mail. In this embodiment, mailpiece 300 has a preformatted block layout for entering identifying information, such as a telephone number. The preformatted block layout for entering identifying information is termed "an ADL format," here embodied as block layout 310 for a telephone number. In other embodiments, mailpiece 300 may be preformatted to correspond to a preferred address block layout that promotes readability of alternate identification codes, such as Social Security Number, Driver's License Number, or other identifying information used by companies or services. The ADL format may use less space on mailpiece 300 then a traditional address block. Block layout 310 may be designed to increase readability and simplify user interface. In one embodiment, the telephone contact inherent in block layout 310 allows for a simplified means of communication when problems arise during delivery.

Figure 4A:
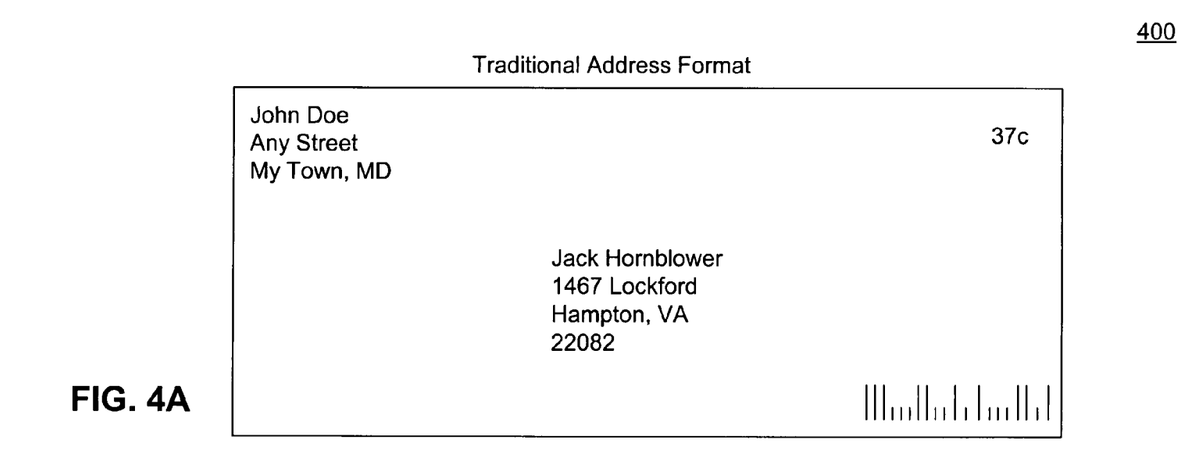
FIG. 4A and FIG. 4B are graphical depictions of a traditional and an ADL mailpiece.
Figure 4B:
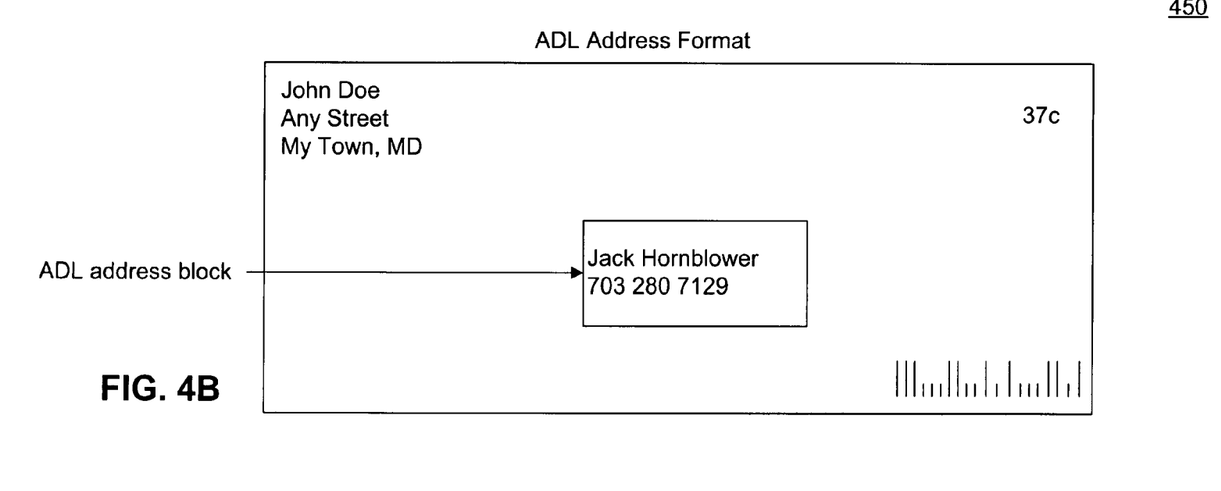

FIG. 4A illustrates a mailpiece 400 with a traditional address format. FIG. 4B illustrates a mailpiece 450 with an ADL address format, in this case a telephone number.

Handling System

Figure 5:
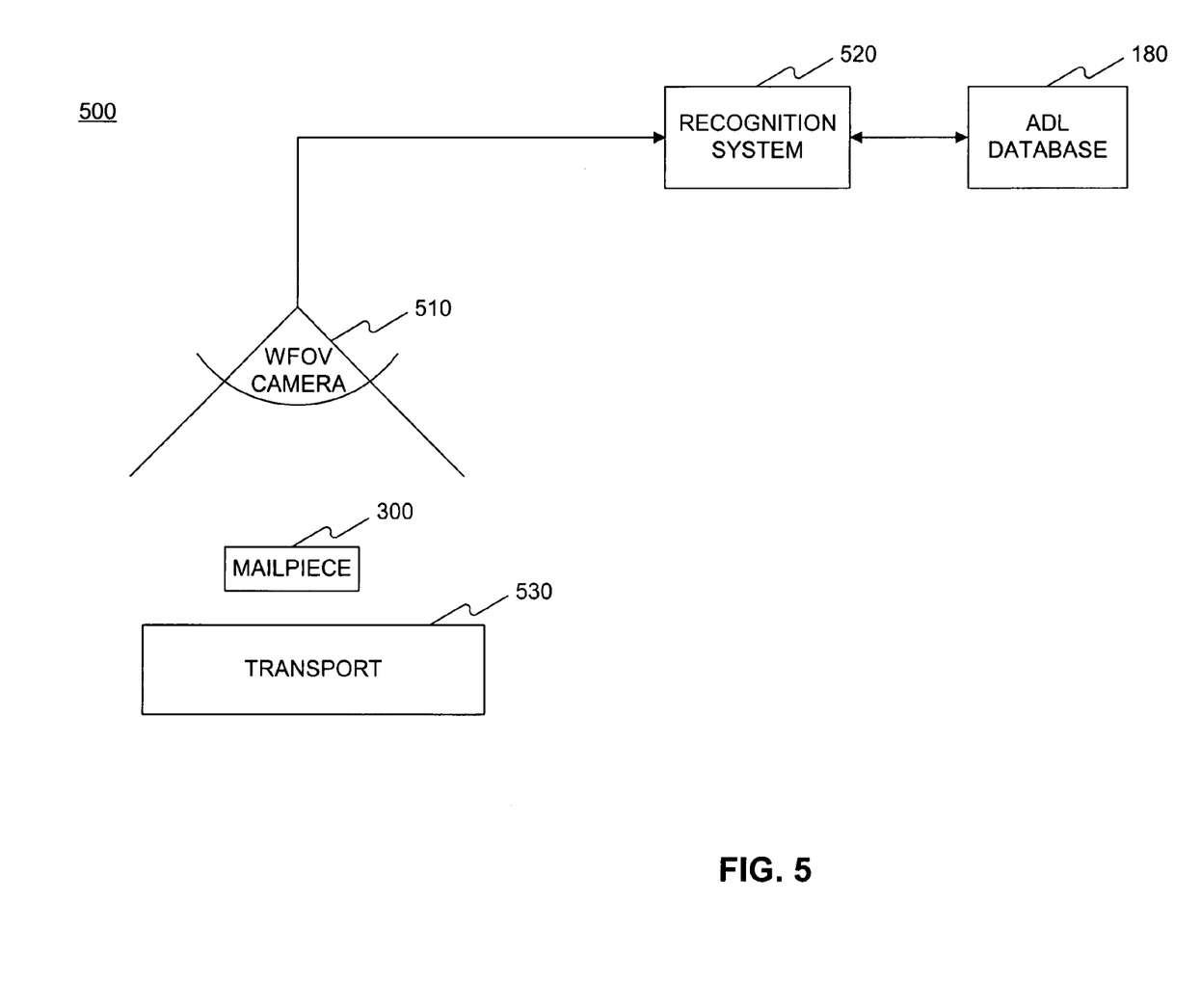
FIG. 5 is a block diagram of an exemplary system for providing ADL, consistent with an embodiment of the invention.

FIG. 5 illustrates a processing system 500, modified to implement an ADL system 100. The system may include a camera 510 linked to recognition system 520, which is linked to ADL database 180. Within processing system 500, a transport 530 is used to handle mailpiece 300.

Referring to FIG. 5, camera 510 is used to analyze mailpiece 300. In one embodiment, mail processing transports may be refitted with a wide field of view (WFOV) camera 510. Camera 510 has the capability to do image analysis and recognition, and has been modified to recognize the simplified ADL format when present, read the telephone number, flag it's presence and send the telephone number together with PLANET and POSTNET codes to the transport 530.

While camera 510 will find and deliver the string of characters identified (flagged) as the telephone number, a recognition system 520 will receive the complete mailpiece image and independently corroborate the analysis of camera 510. This corroborating is a double checking mechanism to increases the accuracy of the final result. In one embodiment, block layout 310 achieves read rates slightly less than bar code read rates.

Existing sorting mechanisms can be slightly modified to create ADL sorting transport 530. One modification to existing sorting mechanisms is the camera 510 interface may be modified to accept any or all of: telephone number, POSTNET, and/or PLANET codes. In a second modification, the transaction file is expanded to accept a telephone number, if present. System 500 accepts the expanded transaction file, which contains the telephone number for the recipient of mailpiece 300. Within system 500, recognition system 520 accesses ADL Database 180 to determine the delivery point information corresponding to the identified telephone number. Mailpiece 300 can then be sorted according to existing sorting mechanisms.

Figure 6:
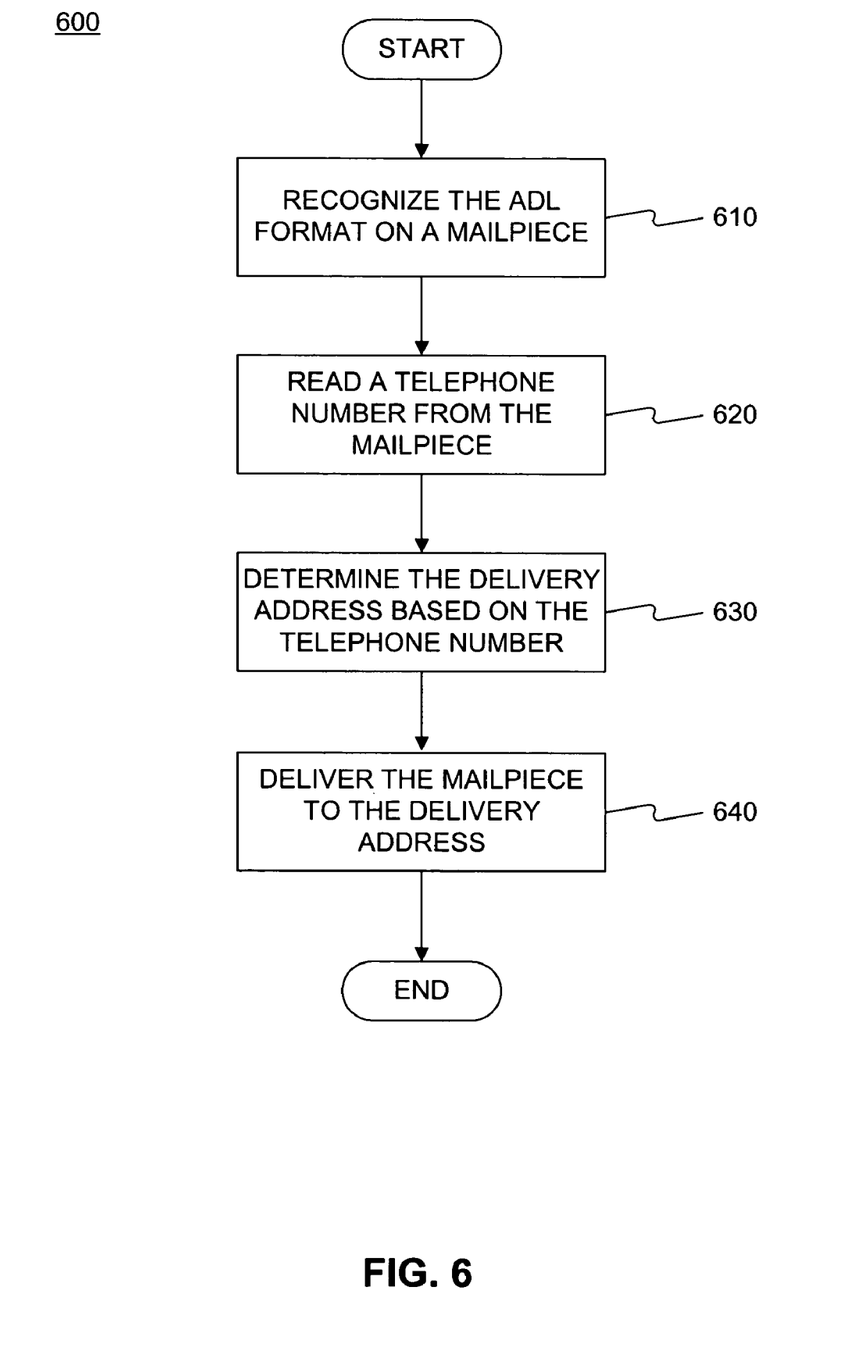
FIG. 6 is a flow diagram of using the ADL system, consistent with an embodiment of the invention.

FIG. 6 is a flow chart of an exemplary process for flexible delivery of a mailpiece consistent with the principles of the present invention. A customer delivers a mailpiece to a Post Office. The mailpiece can be, for example, a letter or a package that the customer wishes to send to a destination address. To do so, the customer marks the mailpiece with a telephone number and delivers it to a Post Office. The Post Office can be a United States Postal Service (USPS) Post Office, a USPS mailbox, or any other facility or location capable of receiving a mailpiece or other item for delivery to a destination address using a system for identifying and processing mail.

Referring to FIG. 6, system 600 captures an image of the mailpiece being delivered and analyzes the image to determine if the mailpiece is in ADL format (step 610). For example, the image may include a telephone number in lieu of a delivery address. In one embodiment, the image is captured by camera 510, which takes an image of mailpiece 300 and "reads" the telephone number, converting it into electronic data usable by recognition system 620.

Returning to FIG. 6, system 600 determines the telephone number on the mailpiece (step 620). System 600 then determines a delivery address, based on the telephone number (step 630). In one embodiment, the delivery address is determined by looking up the telephone number in ADL database 180. The delivery address may then be transformed into a bar code, such as a POSTNET bar code containing the Zip-plus-four-plus-two recipient delivery point code, which is applied to the front of mailpiece 300 and used for further sorting.

In another embodiment, an OCR process is used just once to determine the delivery point, which is stored in a database with a unique identifier, such as a bar code. For example, a database is accessed that contains a telephone number and a corresponding bar code rather than an actual delivery address. Then, the corresponding unique identifier is applied to the mailpiece in a fashion that makes the identifier easy to determine in subsequent tracking, removing the need for another pass through an OCR process. For example, a barcode may be applied directly to the mailpiece. The delivery service then attempts to deliver mailpiece to the delivery address (step 640).

Additional embodiments include modifications to the "Tell a friend" product, where a customer could send mail without knowing the destination address. For mailing campaigns that require coordination in ad delivery and telephone contact, the mail can be tracked with a PLANET code, and then using the telephone number automating a telephone call that is synchronized with the mailpiece. The combination of an address and a telephone number allows for the automation of telephone calls to the destination of the mailpiece to provide information about the mailpiece such as a "notification of arrival" before important articles are to arrive.

Other embodiments of the invention will be apparent to those skilled in the art from consideration of the specification and practice of the invention disclosed herein. For example, one skilled in the art would realize that the principles of the present invention encompass delivery services that implement the described invention completely manually, using an integrated manual/automatic process or a completely automatic process including a manual/automatic inspection, and computerized databases. In addition, one skilled in the art would realize that while the embodiments explained herein relate to telephone numbers, the systems and methods of the present invention would likewise apply to any identification numbers, such as a social security number, a driver's license number, a credit card number, etc., that can be associated with a delivery point address. It is intended that the specification and examples be considered as exemplary only, with a true scope and spirit of the invention being indicated by the following claims.

What is claimed is:

1. A method, implemented using a computer system, for processing a mailpiece using an Address Directory Link (ADL) format, comprising:
   determining whether the mailpiece includes the ADL format, the ADL format including a recipient name and ADL formatted data, wherein the ADL formatted data comprises an un-encrypted telephone number that is human-readable,
   wherein if the mailpiece includes the ADL format, an ADL address process is performed, the ADL address process comprising:
      reading the ADL formatted data from the mailpiece; and
      determining a delivery address based on the ADL formatted data using an ADL database,
      wherein the ADL database is created by matching a reference telephone number in a telephone directory with a delivery bar code in an address database and storing the matched reference telephone number and the delivery bar code,
   wherein if the mailpiece does not include the ADL format, the ADL address process is not performed,
   wherein the mailpiece is received from a sender,
   wherein, after the mailpiece is received from the sender, a service notification is sent to the sender if the ADL formatted data is added to or removed from the ADL database; and
   automatically placing a telephone call, using the ADL formatted data on the mailpiece, to convey information about the mailpiece.

2. The method of claim 1, further comprising:
   delivering the mailpiece to the delivery address associated with the ADL formatted data.

3. The method of claim 1, wherein the ADL format is a standardized block layout.

4. The method of claim 1, wherein the information about the mailpiece is a notification of arrival.

5. The method of claim 1, wherein the information about the mailpiece comprises an arrival time.

6. The method of claim 1, wherein the ADL database comprises:
   the ADL formatted data; and
   the delivery address that corresponds to the ADL formatted data.

7. The method of claim 1, wherein the ADL database comprises:
   the ADL formatted data; and
   a unique identifier that corresponds to the ADL formatted data.

8. The method of claim 7, wherein the unique identifier is a bar code.

9. The method of claim 7, further comprising:
   affixing the unique identifier to the mailpiece.

10. The method of claim 1 further comprising:
    corroborating the reading of the ADL formatted data from the mailpiece.

11. The method of claim 1, wherein
    the ADL database is created by matching a reference telephone number in a telephone directory with delivery point information in an address database and storing the matched reference telephone number and delivery point information.

12. The method of claim 1, wherein if there is no delivery address based on the ADL formatted data, the mailpiece is returned to the sender.

13. A system for processing a mailpiece using an Address Directory Link (ADL) format, comprising:
  means for determining whether the mailpiece includes the ADL format, the ADL format including a recipient name and ADL formatted data, wherein the ADL formatted data comprises an un-encrypted telephone number that is human-readable;
  means for sorting the mailpiece;
  means for ADL processing; and
  means for non-ADL processing,
  wherein if the mailpiece includes the ADL format, the means for sorting sends the mailpiece to the means for ADL processing,
  wherein if the mailpiece does not include the ADL format, the means for sorting sends the mailpiece to the means for non-ADL processing,
  wherein the means for ADL processing comprises:
    means for reading the ADL formatted data from the mailpiece; and
    means for determining a delivery address based on the ADL formatted data using an ADL database,
    wherein the ADL database is created by matching a reference telephone number in a telephone directory with a delivery bar code in an address database and storing the matched reference telephone number and the delivery bar code,
  wherein the mailpiece is received from a sender,
  wherein, after the mailpiece is received from the sender, a service notification is sent to the sender if the ADL formatted data is added to or removed from the ADL database; and
  means for automatically placing a telephone call, using the ADL formatted data on the mailpiece, to convey information about the mailpiece.

14. The system of claim 13, further comprising:
  means for delivering the mailpiece to the delivery address associated with the ADL formatted data.

15. The system of claim 13, wherein the ADL format is a standardized block layout.

16. The system of claim 13, wherein the information about the mailpiece is a notification of arrival.

17. The system of claim 13, wherein the ADL database comprises:
  the ADL formatted data; and
  the delivery address that corresponds to the ADL formatted data.

18. The system of claim 13, wherein the ADL database comprises:
  the ADL formatted data; and
  a unique identifier that corresponds to the ADL formatted data.

19. The system of claim 18, wherein the unique identifier is a bar code.

20. The system of claim 18, further comprising:
  means for affixing the unique identifier to the mailpiece.

21. A computer-readable medium storing instructions to configure a data processor to perform a method for processing a mailpiece using an Address Directory Link (ADL) format, the method comprising:
  determining whether the mailpiece includes the ADL format, the ADL format including a recipient name and ADL formatted data, wherein the ADL formatted data comprises an un-encrypted telephone number that is human-readable,
  wherein if the mailpiece includes the ADL format, an ADL address process is performed, the ADL address process comprising:
    reading the ADL formatted data from the mailpiece; and
    determining a delivery address based on the ADL formatted data using an ADL database,
    wherein the ADL database is created by matching a reference telephone number in a telephone directory with a delivery bar code in an address database and storing the matched reference telephone number and the delivery bar code point,
  wherein if the mailpiece does not include the ADL format, the ADL address process is not performed,
  wherein the mailpiece is received from a sender,
  wherein, after the mailpiece is received from the sender, a service notification is sent to the sender if the ADL formatted data is added to or removed from the ADL database; and
  automatically placing a telephone call, using the ADL formatted data on the mailpiece, to convey information about the mailpiece.

22. The computer-readable medium of claim 21, wherein the ADL format is a standardized block layout.

23. The computer-readable medium of claim 21, wherein the information about the mailpiece is a notification of arrival.

24. The computer-readable medium of claim 21, wherein the information about the mailpiece comprises an arrival time.

25. The computer-readable medium of claim 21, wherein the ADL database comprises:
  the ADL formatted data; and
  the delivery address that corresponds to the ADL formatted data.

26. The computer-readable medium of claim 21, wherein the ADL database comprises:
  the ADL formatted data; and
  a unique identifier that corresponds to the ADL formatted data.

27. The computer-readable medium of claim 26, wherein the unique identifier is a bar code.

* * * * *

UNITED STATES PATENT AND TRADEMARK OFFICE
CERTIFICATE OF CORRECTION

| | | |
|---|---|---|
| PATENT NO. | : 8,165,970 B2 | Page 1 of 1 |
| APPLICATION NO. | : 10/901331 | |
| DATED | : April 24, 2012 | |
| INVENTOR(S) | : Oscar L. Avant | |

It is certified that error appears in the above-identified patent and that said Letters Patent is hereby corrected as shown below:

Claim 21, col. 10, line 22, "bar code point," should read -- barcode, --

Signed and Sealed this
Seventeenth Day of July, 2012

David J. Kappos
*Director of the United States Patent and Trademark Office*